United States Patent [19]
Brakebill

[11] 3,807,254
[45] Apr. 30, 1974

[54] CONTROL DEVICE HAVING AN ADJUSTABLE RANGE AND METHOD OF MAKING THE SAME

[75] Inventor: Harold G. Brakebill, Concord, Tenn.

[73] Assignee: Robertshaw Controls Company, Richmond, Va.

[22] Filed: Nov. 20, 1972

[21] Appl. No.: 308,282

[52] U.S. Cl............ 74/526, 29/407, 73/362.7, 116/133, 192/139, 337/360
[51] Int. Cl................ F16d 71/04, H01h 37/12
[58] Field of Search........ 74/10.2, 526; 73/362.7; 116/133; 192/139; 337/360, 323, 392; 29/407

[56] References Cited
UNITED STATES PATENTS

| | | | |
|---|---|---|---|
| 2,719,199 | 9/1955 | Holmes | 337/392 X |
| 2,729,719 | 1/1956 | Kronmiller | 337/360 X |
| 791,124 | 5/1905 | Baehr | 74/526 |
| 1,330,298 | 2/1920 | Baird | 74/526 X |
| 1,659,544 | 2/1928 | Dodge | 74/526 X |
| 1,699,785 | 1/1929 | Geiger et al. | 192/139 |
| 2,746,573 | 5/1956 | Hastings | 192/139 X |
| 3,670,284 | 6/1972 | Fortier | 337/360 |

Primary Examiner—Allan D. Herrmann
Attorney, Agent, or Firm—Candor, Candor & Tassone

[57] ABSTRACT

A control device having a support and a selector member movably carried thereby, the support having an abutment thereon and the selector member carrying a pair of adjustable stops that span the abutment so that adjustment of the stops respectively toward or away from the abutment will define the limits of movement of the selector member in opposite directions relative to the support. Each adjustable stop comprises a nut and bolt carried by the selector member with the shank of each bolt passing through a slot in the selector member so that loosening of the nut thereon permits the respective nut and bolt stop arrangement to slide in the slot to the desired adjusted position thereof where the nut can then be tightened to fasten the respective stop in the adjusted position thereof.

18 Claims, 9 Drawing Figures

3,807,254

CONTROL DEVICE HAVING AN ADJUSTABLE RANGE AND METHOD OF MAKING THE SAME

This invention relates to a control device having an adjustable range as well as to a method for making such a control device or the like.

It is well known that thermostats have been provided with a selector member which can be manually moved through a fixed temperature range thereof to select a desired temperature that the thermostat is to maintain through its operative interconnection with a heat exchanger or the like.

It has been found according to the teachings of this invention that there are situations where it might be desirable that the user of such a thermostat be limited in the amount of high and low temperature selection he is permitted to make in order that adverse conditions will not arise, such as someone making the temperature in a building at too high or too low a degree for the general comfort of all concerned.

Therefore, it is a feature of this invention to provide a control device of the above type or of other types wherein the movable selector thereof can be limited in the amount of movement thereof to limit the range of adjustment of such a control device or the like.

In particular, one embodiment of this invention provide a control device having a support means and a selector means movably carried by the support means for adjusting the operating condition of the control device. The support means has an abutment means thereon and the selector means has a pair of adjustable stop means carried thereby and spanning the abutment means so that adjustment of the stop means respectively toward or away from the abutment means will define the limits of movement of the selector means in opposite directions relative to the support means.

Such adjustable stop means can each comprise a nut and bolt carried by the selector means with the shank portion of the bolt passing through a slot means in the selector means so that loosening of the nut permits the respective nut and bolt arrangement to slide in the slot to the desired position whereby subsequent tightening of the nut will fix that particular stop in the selected position thereof.

Accordingly, it is an object of this invention to provide an improved control device having one or more of the novel features set forth above or hereinafter shown or described.

Another object of this invention is to provide a method for making such a control device or the like.

Other objects, uses and advantages of this invention are apparent from a reading of this description, which proceeds with reference to the accompanying drawings forming a part thereof and wherein.

Figure 1:
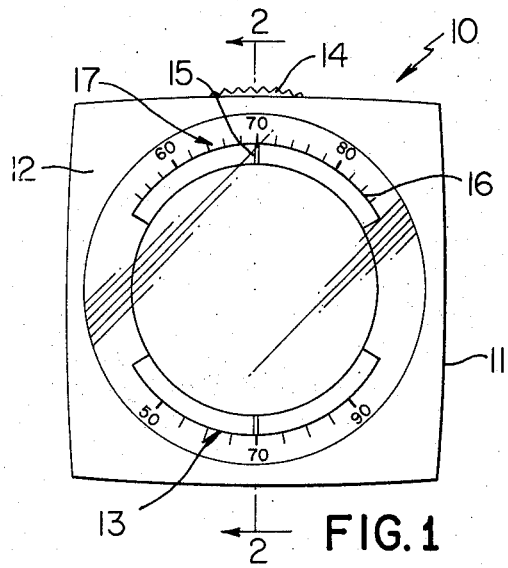
FIG. 1 is a front view of the improved control device of this invention.

While the various features of this invention are hereinafter described and illustrated as being particularly adapted for providing range adjusting means for a thermostat construction, it is to be understood that the various features of this invention can be utilized singly or in any combination thereof to provide range adjustment means for other types of control devices as desired.

Therefore, this invention is not to be limited to only the embodiment illustrated in the drawings, because the drawings are merely utilized to illustrate one of the wide variety of uses of this invention.

Referring now to FIG. 1, the improved control device of this invention is generally indicated by the reference numeral 10 and comprises a housing or support means 11 provided with a removable cup-shaped cover 12 having a thermometer construction 13 for indicating the actual temperature being sensed by the control device 10 and a movable selector member 14 for permitting the operator to select the desired temperature that the control device 10 is to tend to maintain through its operative interconnection with a heat exchanger (not shown) in a conventional manner as it is well known that various thermostat constructions can be provided each with a movable selector member for selecting a desired temperraure output effect.

Figure 2:
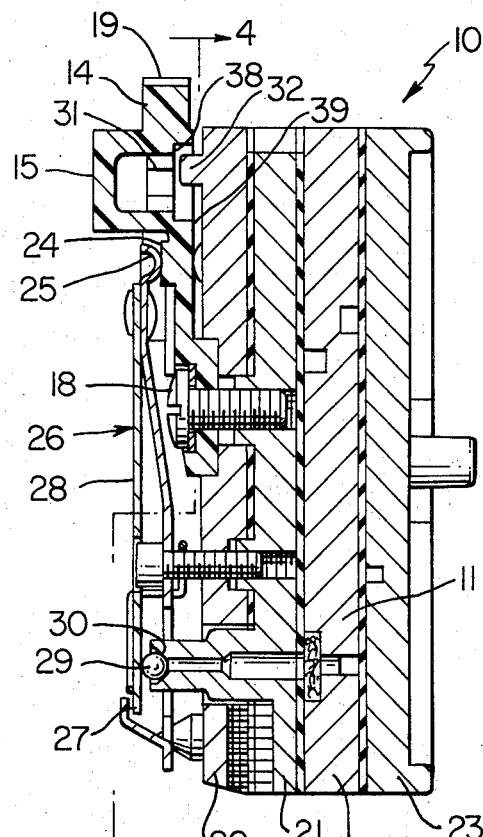
FIG. 2 is an enlarged, cross-sectional view taken on line 2—2 of FIG. 1 with the cover member of the control device completely removed.

In the embodiment of the invention illustrated in the drawings, the selector member 14 of the control device 10 of this invention has a projecting indicator 15 thereon which is adapted to be viewable through a window 16 formed in the casing 12 so as to be positioned adjacent a desired temperature indication on a scale 17 disposed on the casing 12 adjacent the window 16, the selector member 14 being rotatably mounted to the support structure 11 by a threaded fastening member 18, FIG. 2, while having an outer ribbed peripheral portion 19 thereof projecting out of the cover means 12 for facilitating movement of the selector member 14 relative to the support means 11.

As illustrated in FIG. 2, the support means 11 can comprise a pair of plates 20, 21, 22 and 23 disposed in stacked relation and packaging therein a pneumatic control system for operating the aforementioned heat exchanger or the like. Since the particular details of the control device 10 and its operative interconnection with the heat exchanger means does not form a part of this invention, it is deemed only necessary to state that the selector member 14 has an arcuate cam rise or surface 24 which operates on one end 25 of a bimetal arrangement 26 that has one end 27 of a bimetal member 28 bearing against a ball valve member 29 disposed in a conical valve seat 30. The end 27 of the bimetal member 28 tends to urge the ball valve member 29 against the valve seat 30 with a certain force when the bimetal member 28 is sensing a certain temperature and the selector member 14 is set for a certain temperature whereby the fluid bleed through the valve seat 30 at the ball valve member 29 will be in accordance with the temperature that is sensed by the bimetal member 28. This bleed through the ball valve member 29, in turn, controls the heat exchanger so that if the temperature being sensed by the bimetal member 28 is below the temperature setting of the selector member 14, a greater or lesser bleed through the ball valve member 29 is created as the case may be so that the output temperature effect of the heat exchanger is increased to rise to the temperature setting of the selector member 14. Conversely, should the temperature being sensed by the bimetal member 28 exceed the temperature setting of the selector member 14, the bleed through the ball valve member 29 is increased or decreased in a manner opposite from that previously stated for under heating so that the heat exchanger tends to decrease its output temperature effect until the temperature in the room falls to the selected temperature of the selector means 14.

Therefore, it can be seen that by the operator moving the selector member 14 relative to the support means 11, the cam rise 24 will cause the bimetal arrangement 26 to select a desired temperature as indicated by the indicator 15 adjacent the temperature scale 17.

However, as previously stated, sometimes it is desirable that the operator of the thermostat 10 only be permitted to select a range of temperatures less than the full extreme range that the thermostat 10 is adapted to provide.

Thus, the control device 10 is provided with means of this invention for limiting the range of selection of the selector member 14 if it should be desired to so limit the range of movement of the selector means 14.

Figure 3:
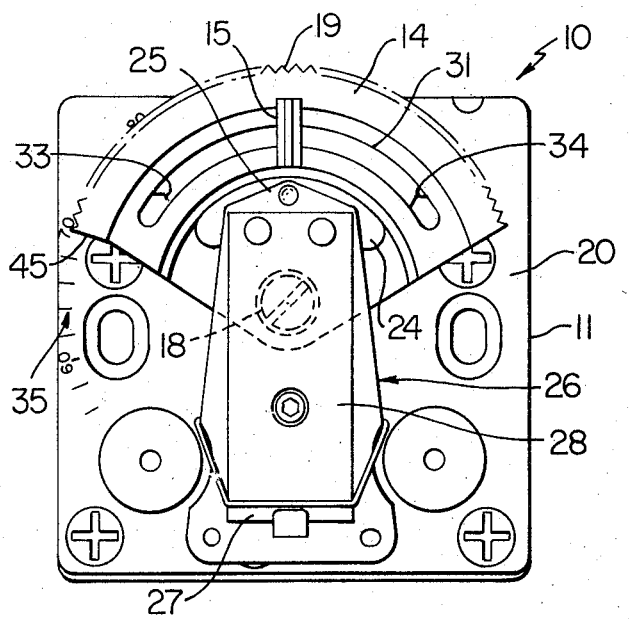
FIG. 3 is an enlarged front view of the control device of FIG. 1 with the front cover thereof completely removed.
Figure 4:
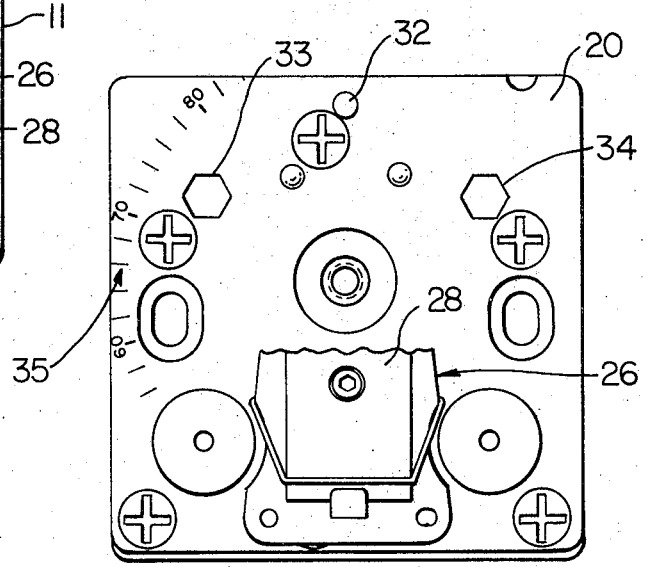
FIG. 4 is a cross-sectional view taken substantially on the lines of 4—4 of FIG. 2.

In particular, it can readily be seen in FIGS. 2 and 3 that an arcuate slot means 31 is formed through the selector member 14 adjacent the cam rise 24 thereof with such slot means 31 being adapted to be rotated in alignment over an outwardly directed abutment or pin 32 projecting outwardly from the support means 11 at the top plate 20 thereof in the manner thereof illustrated in FIG. 4.

As illustrated in FIG. 4, a pair of recesses 33 and 34 are respectively formed in the support means 11 at the top plate 20 thereof with each recess 33 and 34 having a particular configuration to correspond to a nut configuration as will be apparent hereinafter, the particular configuration of the recesses 33 and 34 illustrated in the drawings being hexagonal and both being disposed in the path of movement of the slot means 31 of the selector member 14 for a purpose hereinater described.

A temperature scale 35 is also provided on the support means 11 at the top plate 20 thereof as illustrated in FIG. 4 for a purpose hereinafter described.

Figure 7:
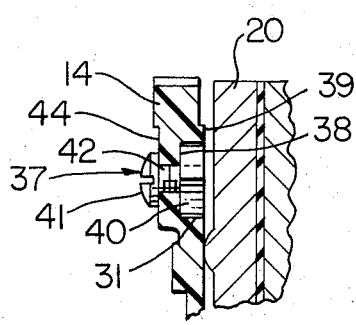
FIG. 7 is a fragmentary, cross-sectional view taken on line 7—7 of FIG. 6.

A pair of adjustable stop means 36 and 37 of this invention are adapted to be carried by the selector member 14 in a manner to span the abutment 32 of the support means 11 and be engageable therewith for limiting the range of movement of the selector means 14 relative to the support means 11, the stop means 36 and 37 being adjustable in the slot means 31 of the selector member 14 in the manner illustrated in FIG. 7.

In particular, it can be seen in FIG. 7 that the slot means 31 that passes through the selector member 14 provides a shoulder 38 inwardly recessed from the outer side 39 of the selector member 14 whereby a hexagonal nut 40 for each stop means 36 and 37 is adapted to be received in the slot means 31 against the shoulder 38 thereof and be prevented from rotating therein because of the dimension of the stepped slot means 31 at the shoulder 38. A bolt 41 is provided for each adjustable stop 36 and 37 and has the threaded shank portion 42 thereof passing through the slot 31 with the enlarged head 43 thereof bearing against the other side 44 of the selector member 14 so that a tightening of the bolt 41 causes the head 43 thereof and the nut 40 thereon to respectively clamp against the side 44 and the shoulder 38 of the selector member 14 to prevent sliding movement of that particular bolt and nut arrangement in the slot means 31. Of course, loosening of the nut 40 will permit a sliding adjustment of that particular nut and bolt in the slot 31 to the desired position therein where the nut 40 can again be tightened to secure the stop 36 or 37 in the desired position thereof.

Figure 5:
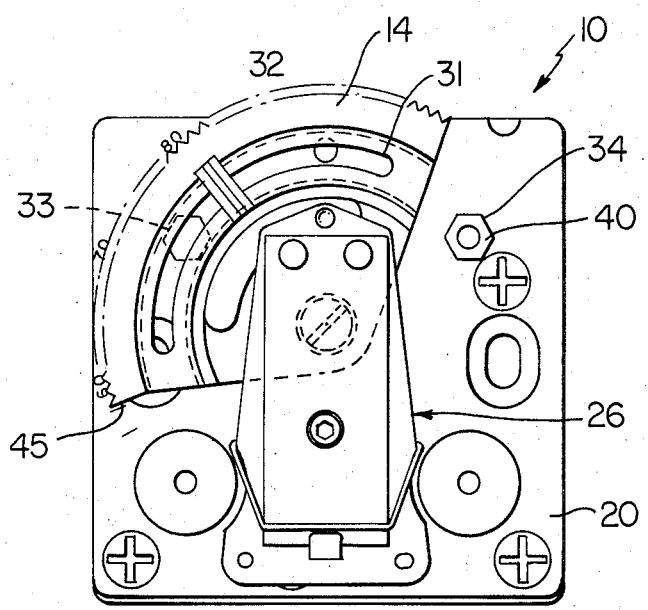
FIG. 5 is a view similar to FIG. 3 but with the selector means moved to one extreme position thereof.
Figure 5A:
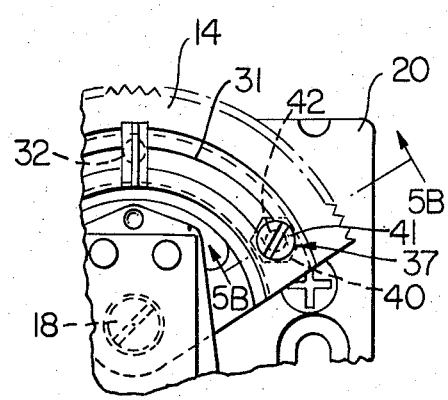
FIG. 5A is a fragmentary view similar to FIG. 5 but with the selector member moved over an inserted nut of one of the stop means thereof.
Figure 5B:
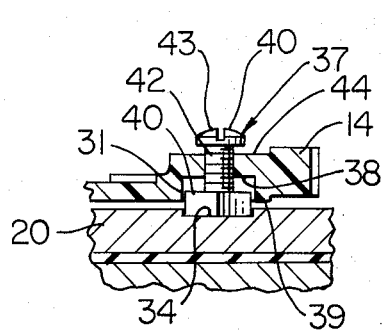
FIG. 5B is a fragmentary cross-sectional view taken on line 5A—5A of FIG. 5A with the bolt of the stop arrangement inserted in the selector member.
Figure 6:
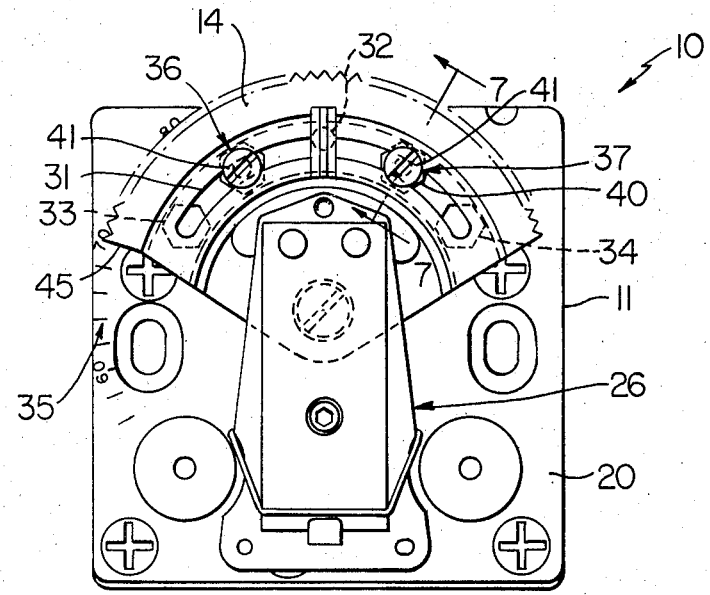
FIG. 6 is a view similar to FIG. 3 but illustrating the stop means of this invention having been disposed in a selected position thereof.

When it is desired to initially assemble each stop means 36 and 37 to the selector member 14, the cover member or casing 12 is removed from the supporting structure 11 of the control device 10 expose the selector member 14 in the manner illustrated in FIG. 3. The selector member 14 is then moved to one extreme position thereof in the manner illustrated in FIG. 5 so as to expose the particular recess 33 or 34 as the case may be. With the selector member 14 in such extreme position as illustrated in FIG. 5, a nut 40 is disposed in the particular exposed recess 33 or 34 and then the selector member 14 is rotated to an intermediate position thereof so that the slot means 31 is now disposed over the nut 40 in the manner illustrated in FIG. 5A so that the bolt 41 can have its shank portion 42 inserted through the slot means 31 to be concentric with the nut 40 and be threaded therein in the manner illustrated in FIG. 5B to cause the interconnection of the bolt 41 with the nut 40. As the bolt 41 is threaded into the nut 40, the nut 40 will eventually rise out of the particular recess 33 or 34 into the cam slot 31 against the shoulder 38 thereof in the manner illustrated in FIG. 7 so that the selector member 14 then can be moved relative to the support means 11. The other nut 40 for the remaining adjustable stop 36 or 37 is likewise disposed in its recess 33 or 34 when the selector means 14 is moved to the other extreme position thereof and is subsequently interconnected to the selector member 14 by its bolt 41 in the same manner as previously described for the other stop.

Once the stop means 36 and 37 have been assembled to the selector member 14 in the manner previously described without completely tightening the nuts 40 thereon, the desired range of movement of the selector means 14 can now be set by first positioning the edge 45 of the selector member 14 at the desired lowest temperature setting on the scale 35 on the support means 11 and with the selector means 14 being so positioned, the stop means 34 is moved in the slot means 31 until the nut 40 thereof abuts against the right side of the stop pin or abutment means 32 of the support means 11. At this time, the nut 40 of the stop means 37 is tightened to fasten the stop means 37 in that particular position.

The selector member 14 is then moved so that the edge 45 thereof is positioned adjacent the highest temperature that it is desired for the selector means 14 to be movable to, and with the selector means 14 in such selected position, the stop means 36 is moved in the slot 31 until the nut 40 thereof abuts against the left side of the stop pin or abutment means 32 of the support means 11. The nut 40 of the stop means 36 is then tightened to fasten the stop means 36 in such position.

Thereafter, the cover 12 is replaced on the support means 11 and it can be seen that the selector means 14 can only be moved through the selected range thereof as the respective stop means 36 and 37 limit the movement of the selector means 14 in the opposite directions relative to the pin 32. Of course, the stop means 36 and 37 can be utilized to cause the control device 10 to only provide one set temperature thereof because when the selector means 14 has its edge 45 disposed at the desired temperaure on the scale 35, both stop means 36 and 37 could be moved against the left and right sides of the abutment means 32 and be tightened thereagainst so that the selector means 14 cannot be moved from such set temperature thereof.

Therefore, it can be seen that this invention provides means wherein the selector means 14 and control device 10 can provide a full range of temperature selection if desired or any smaller temperature range either limiting the high side thereof by using only stop means 36, the low side thereof by using only the stop means 37, or, both the high and low sides thereof by using both stop 36 and 37. Also, if desired, the stops 36 and 37 can be used for providing only a single selected temperature setting for the device 10.

Accordingly, it can be seen that this invention provides a control device having improved range selection therefor as well as to a method for making such a control device or the like.

While the form and method of this invention now preferred have been illustrated and described as required by the Patent Statute, it is to be understood that other forms and methods can be utilized and still come within the scope of the appended claims.

What is claimed is:

1. A control device having a support means and a selector means movably carried by said support means, said support means having an abutment means thereon, and a pair of adjustable stop means carried by said selector means and spanning said abutment means so that adjustment of said stop means respectively toward or away from said abutment means will define the limits of movement of said selector means in opposite directions relative to said support means, said support means having a pair of spaced recesses therein each being adapted to be respectively uncovered by said selector means when said selector means is moved to extreme positions relative to said support means.

2. A control device as set forth in claim 1 wherein said selector means is rotatably mounted to said support means.

3. A control device as set forth in claim 2 wherein said adjustable stop means each comprises a nut and bolt carried by said selector means.

4. A control device as set forth in claim 3 wherein said selector means has an arcuate slot means therein, each bolt having the shank thereof passing through said slot means whereby loosening of said nut thereon permits the respective nut and bolt to slide in said slot means to the desired adjusted position thereof where said nut can then be tightened to hold the respective nut and bolt at the selected adjusted position thereof.

5. A control device as set forth in claim 1 wherein each recess has a shape complementary to part of each stop means.

6. A control device as set forth in claim 5 wherein each adjustable stop means comprises a nut and bolt, each nut having said shape that is complementary to said recesses.

7. A control device as set forth in claim 1 wherein said selector means has an indicator thereon for indicating the selected position thereof.

8. A control device as set forth in claim 1 wherein said selector means has a cam means thereon for adjusting said control device in accordance with the selected position of said selector means.

9. A control device having a support means and a selector means movably carried by said support means, said support means having an abutment means thereon, and a pair of adjustable stop means carried by said selector means and spanning said abutment means so that adjustment of said stop means respectively toward or away from said abutment means will define the limits of movement of said selector means in opposite directions relative to said support means, said selector means being rotatably mounted to said support means, said adjustable stop means each comprising a nut and bolt carried by said selector means, said selector means having an arcuate slot means therein, each bolt having the shank thereof passing through said slot means whereby loosening of said nut thereon permits the respective nut and bolt to slide in said slot means to the desired adjusted position thereof where said nut can then be tightened to hold the respective nut and bolt at the selected adjusted position thereof, said support means having a scale means thereon to facilitate the setting of said stop means at the desired range thereof.

10. A method for making a control device having a support means and a selector means movably carried by said support means comprising the steps of forming said support means with an abutment means projecting therefrom, forming said support means with a pair of spaced recesses therein so that each recess is adapted to be respectively uncovered by said selector means when said selector means is moved to extreme positions relative to said support means, disposing a pair of adjustable stop means on said selector means to span said abutment means, and adjusting said stop means respectively toward or away from said abutment means so as to define the limits of movement of said selector means in opposite directions relative to said support means.

11. A method as set forth in claim 10 and including the step of rotatably mounting said selector means to said support means.

12. A method as set forth in claim 11 and including the step of forming each of said adjustable stop means with a nut and bolt to be carried by said selector means.

13. A method as set forth in claim 12 and including the steps of forming said selector means with an arcuate slot means therein and disposing the shank of each bolt through said slot means whereby the loosening of said nut thereon permits the respective nut and bolt to slide in said slot means to the desired adjusted position thereof where said nut can then be tightened to hold the respective nut and bolt at the selected adjusted position thereof.

14. A method as set forth in claim 11 and including the step of forming each recess with a shape complementary to part of each stop means.

15. A method as set forth in claim 14 and including the step of forming each adjustable stop means from a nut and bolt, each nut having said shape that is complementary to said recesses.

16. A method as set forth in claim 10 and including the step of forming said selector means with an indicator thereon for indicating the selected position thereof.

17. A method as set forth in claim 10 and including the step of forming said selector means with a cam means thereon for adjusting said control device in accordance with the selected position of said selector means.

18. A method for making a control device having a support means and a selector means movably carried by said support means comprising the steps of forming said support means with an abutment means projecting therefrom, disposing a pair of adjustable stop means on said selector means to span said abutment means, adjusting said stop means respectively toward or away from said abutment means so as to define the limits of movement of said selector means in opposite directions relative to said support means, rotatably mounting said selector means to said support means, forming each of said adjustable stop means with a nut and bolt to be carried by said selector means, forming said selector means with an arcuate slot means therein and disposing the shank of each bolt through said slot means whereby the loosening of said nut thereon permits the respective nut and bolt to slide in said slot means to the desired adjusted position thereof where said nut can then be tightened to hold the respective nut and bolt at the selected adjusted position thereof, and forming said support means with a scale means thereon to facilitate the setting of said stop means at the desired range thereof.

* * * * *